(12) United States Patent
Ger et al.

(10) Patent No.: US 8,283,870 B2
(45) Date of Patent: Oct. 9, 2012

(54) BYPASS PROTECTION CIRCUIT AND LIGHT EMITTING DIODE DRIVING DEVICE USING THE SAME

(75) Inventors: Chih-Chan Ger, Jhongli (TW); Chia-Kun Chen, Jhongli (TW); Chi-Chang Lu, Taipei Hsien (TW)

(73) Assignees: Ampower Technology Co., Ltd., Jhongli, Taoyuan County (TW); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 357 days.

(21) Appl. No.: 12/702,226

(22) Filed: Feb. 8, 2010

(65) Prior Publication Data
US 2011/0148306 A1 Jun. 23, 2011

(30) Foreign Application Priority Data
Dec. 18, 2009 (CN) .......................... 2009 2 0317862

(51) Int. Cl.
*H05B 37/00* (2006.01)
(52) U.S. Cl. .................. 315/125; 315/185 R; 315/306
(58) Field of Classification Search .................. 315/119, 315/125, 185 R, 291, 294, 306, 307
See application file for complete search history.

(56) References Cited

U.S. PATENT DOCUMENTS

| | | | |
|---|---|---|---|
| 7,994,725 B2 * | 8/2011 | Bouchard | 315/122 |
| 2007/0159750 A1 * | 7/2007 | Peker et al. | 361/93.1 |
| 2008/0191642 A1 * | 8/2008 | Slot et al. | 315/295 |
| 2010/0109570 A1 * | 5/2010 | Weaver | 315/295 |
| 2011/0006689 A1 * | 1/2011 | Blanchard et al. | 315/121 |

* cited by examiner

*Primary Examiner* — Tung X Le
(74) *Attorney, Agent, or Firm* — Altis Law Group, Inc.

(57) ABSTRACT

A bypass protection circuit connected to a light emitting diode (LED) group in parallel, comprises a switch circuit and a capacitor. The switch circuit comprises a plurality of switch components, an abnormal detection module and a switch control module. The abnormal detection module detects voltage of the LEDs respectively, and determines which one is broken and outputs an abnormal signal. The switch control module controls a switch component connected to the broken LED in parallel on/off according to the abnormal signal. The capacitor is charged by driving signals of the LEDs when the LEDs are operated according to a normal working mode or a first status of a burst dimming mode, and is discharged to maintain an operating power of the switch circuit when the LEDs are operated according to a second status of the burst dimming mode.

12 Claims, 3 Drawing Sheets

BYPASS PROTECTION CIRCUIT AND LIGHT EMITTING DIODE DRIVING DEVICE USING THE SAME

BACKGROUND

1. Technical Field

The present disclosure relates to a bypass protection circuit and a light emitting diode (LED) driving device using the same.

2. Description of Related Art

Due to a low energy consumption, light emitting diodes (LEDs) having a high efficiency and a long useful life are gradually becoming used for backlights of liquid crystal displays (LCDs). In general, one backlight comprises a plurality of LED lamp bars, and each LED lamp bar is composed of a plurality of LEDs connected in series, which can illuminate the LCDs. However, when any one LED does not work (e.g., do not light up), other LEDs connected to the broken LED in series also do not work, which decreases reliability of the backlight.

DETAILED DESCRIPTION

Figure 1:
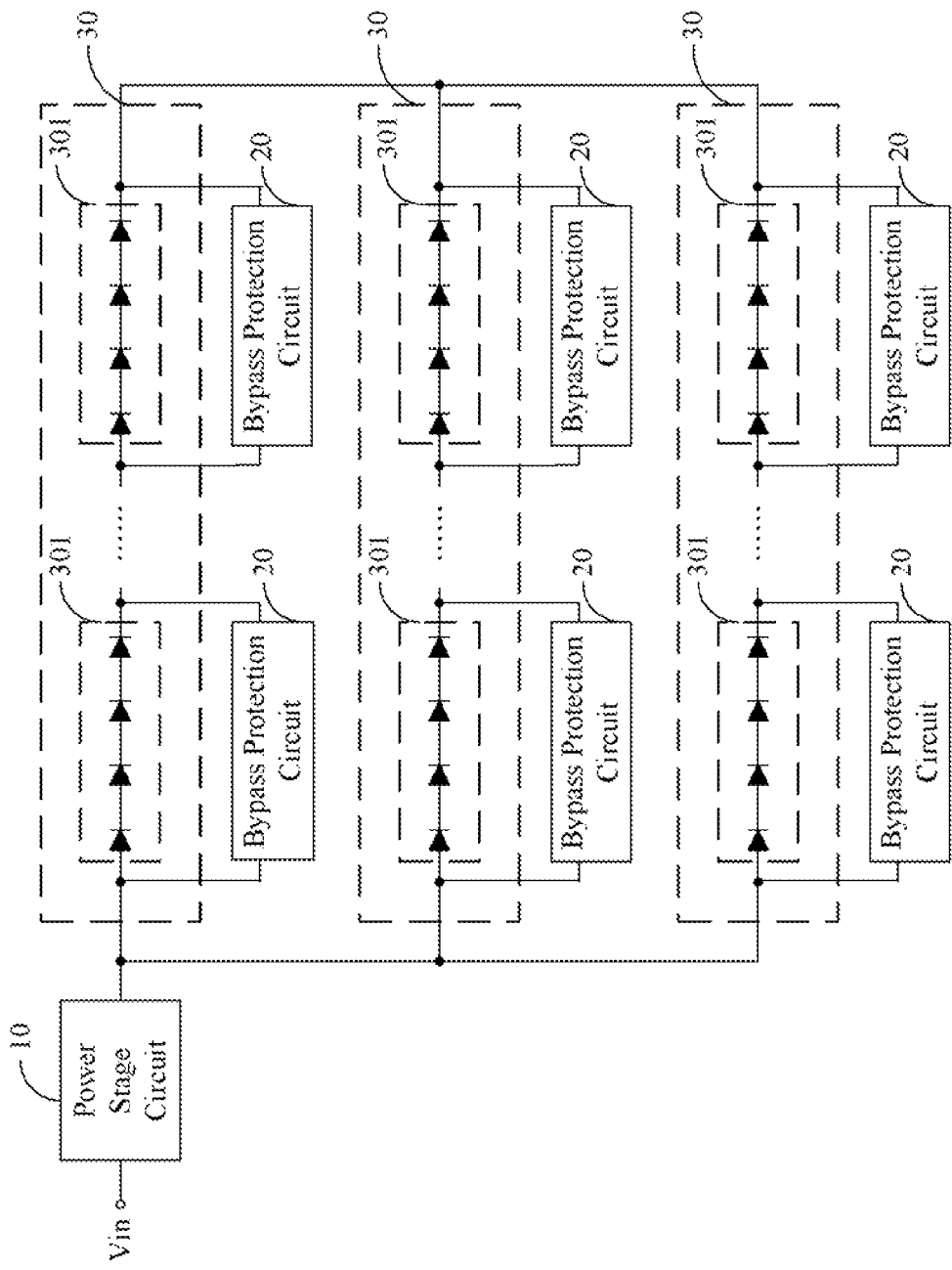
FIG. 1 is a block diagram of one embodiment of an LED driving device.

FIG. 1 is a block diagram of one embodiment of an LED driving device of present disclosure. The LED driving device may be used to drive a plurality of LED lamp bars 30, and comprises a power stage circuit 10 and a plurality of bypass protection circuits 20. The power stage circuit 10 converts external power signals Vin into driving signals to drive the LED lamp bars 30. Each LED lamp bar 30 is composed of a plurality of LED groups 301 that comprises a plurality of LEDs connected in series. The LED groups 301 are operated according to a normal working mode or a burst dimming mode of the LED driving device, and each LED group 301 has a common anode receiving the driving signals and a common cathode. In addition, each LED group 301 is connected to one bypass protection circuit 20 in parallel, to provide a bypass path when any one LED of the LED group 301 is broken, causing an open circuit. In one embodiment, each LED group 301 comprises four LEDs connected in series. In alternative embodiments, numbers of the LEDs of each LED group 301 can be different.

Figure 2:
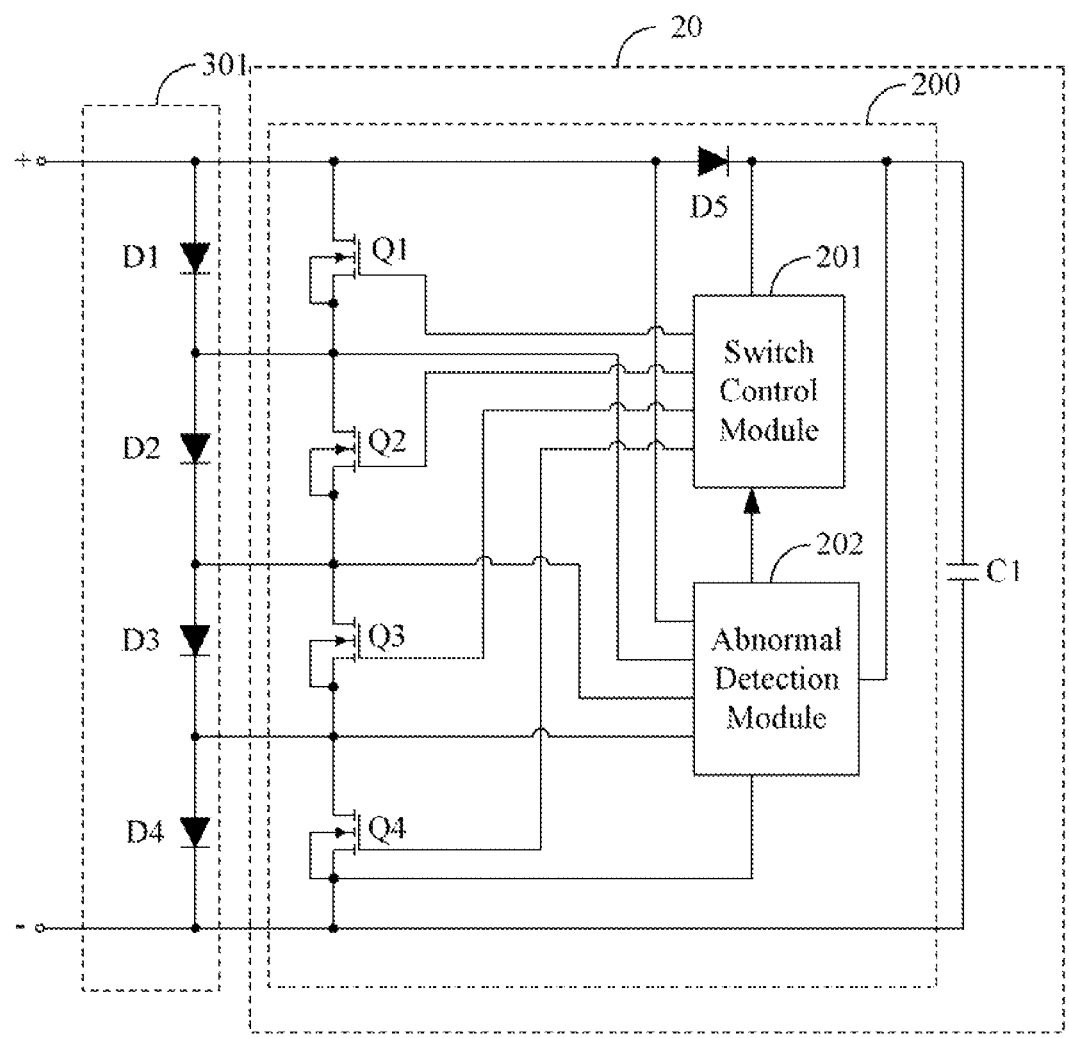
FIG. 2 is a detailed circuit diagram of a first embodiment of a bypass protection circuit of FIG. 1.

FIG. 2 is a detailed circuit diagram of a first embodiment of a bypass protection circuit 20 of FIG. 1. The bypass protection circuit 20 is connected to the LED group 301 in parallel, and the LED group 301 is composed of four LEDs D1, D2, D3 and D4. When any one of the LEDs D1, D2, D3, D4 is broken, the bypass protection circuit 20 provides a bypass path.

The bypass protection circuit 20 comprises a switch circuit 200 and a capacitor C1. In one embodiment, the switch circuit 200 is an integrated circuit and comprises a plurality of switch components Q1, Q2, Q3, Q4, a switch control module 201, an abnormal detection module 202, and a diode D5. Number of the switch components Q1, Q2, Q3, Q4 is the same as that of the LEDs D1, D2, D3, D4 of the LED group 301, and the switch components Q1, Q2, Q3, Q4 are connected to the LEDs D1, D2, D3, D4 in parallel respectively (e.g. the switch component Q1 is connected to the LED D1 in parallel).

The abnormal detection module 202 is connected to the LED group 301, to detect voltage of the LEDs D1, D2, D3, D4 respectively, and to determine which of the LEDs D1, D2, D3, D4 are broken, if any, and output an abnormal signal.

The switch control module 201 is connected to the switch components Q1, Q2, Q3, Q4 and the abnormal detection module 202, to control a corresponding switch component to turn on according to the abnormal signal and provide the bypass path. For example, if the LED D1 is broken, the abnormal detection module 202 outputs the abnormal signal to the switch control module 201, thus, the switch control module 201 controls the switch component Q1 to turn on to provide the bypass path to the LED D1. Therefore, the LED group 301 can operate normally. Similarly, the LEDs D2, D3, D4 are also protected by the abnormal detection module 202.

The capacitor C1 is connected to the LED group 301 in parallel, to discharge and provide an operating power to the switch circuit 200 based on the driving signals of the LED group 301. In general, each integrated circuit needs a power source to maintain a normal operation thereof. The power source can be obtained from an external power, or converted by an internal circuit.

In the burst dimming mode, the driving signal of the LED group 301 are pulse width modulation (PWM) signals, and current flowing through the LED group 301 is changed by adjusting duty cycle of the PWM signals, consequently, brightness of the LED backlight is adjusted. Normally, the PWM signals are period signals with high/low logic levels (e.g., logical 1 and logical 0, respectively). In one embodiment, the high logic levels of the PWM signals indicate that there are driving signals output to the LED group 301, which is defined as a first status of the burst dimming mode; and the low logic levels of the PWM signals indicate that there are no driving signals output to the LED group 301, which is defined as a second status of the burst dimming mode. No current flows through the LED group 301 in the second status of the burst dimming mode, thus, the capacitor C1 discharges to the switch circuit 200 and maintains the discharge circuit 200 to operate normally.

When the LED group 301 is in the normal operation mode or the first status of the burst dimming mode, the driving signals of the LED group 301 provides operating power to the switch circuit 200 and also charges the capacitor C1. When the LED group 301 is in the second status of the burst dimming mode, no current flows through the LED group 301 and no driving signals are provided to the switch circuit 200. Thus, the capacitor C1 discharges to the switch circuit 200 to maintain the switch circuit 200 to operate normally.

In one embodiment, the diode D5 has an anode connected to the common anode of the LED group 301 and a cathode connected to the capacitor C1, which makes the driving signals of the LED group 301 to charge the capacitor C1 and also protect the capacitor C1 discharging to the LED group 301 in the burst dimming mode.

Figure 3:
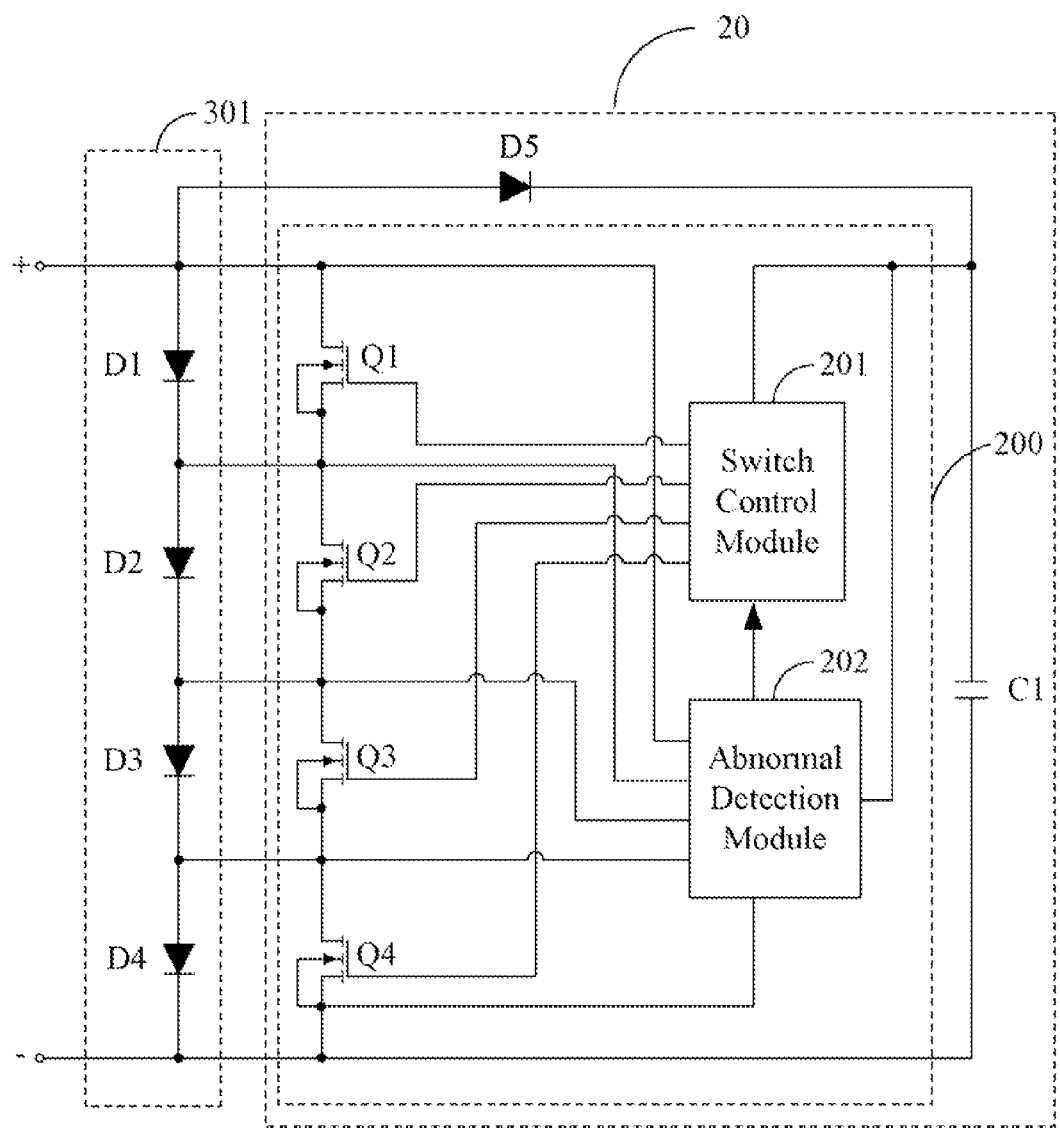
FIG. 3 is a detailed circuit diagram of a second embodiment of a bypass protection circuit of FIG. 1.

FIG. 3 is a detailed circuit diagram of a second embodiment of bypass protection circuit 20, which is substantially the same as that of FIG. 2, a difference being that the diode D5 is placed outside of the integrated circuit 200 and connected between the LED group 301 and the capacitor C1, to avoid the capacitor C1 discharging to the LED group 301.

In the present disclosure, each LED group 30 comprises at least one bypass protection circuit 20. When any one LED is broken, the bypass protection circuit 20 can provide a bypass path to maintain the LED group 301 to operate normally. Therefore, the LED lamp bars 30 have a high reliability.

Although the features and elements of the present disclosure are described in various inventive embodiment in particular combinations, each feature or element can be configured alone or in various within the principles of the present disclosure to the full extent indicated by the broad general meaning of the terms in which the appended claims are expressed.

What is claimed is:

1. A bypass protection circuit connected to a light emitting diode (LED) group in parallel, wherein the LED group comprises a plurality of LEDs connected in series and comprises a common anode and a common cathode at two opposite ends of the LED group, the bypass protection circuit comprising:
   a switch circuit, comprising:
      a plurality of switch components, wherein each switch component is connected to one LED in parallel, when at least one LED is broken, the switch component corresponding to the at least one broken LED is switched on to provide a bypass path;
      an abnormal detection module to detect voltage of the LEDs respectively, and to output an abnormal signal when the at least one LED is broken; and
      a switch control module connected to the switch components and the abnormal detection module, to control the switch component corresponding to the at least one LED on according to the abnormal signal; and
   a capacitor connected between the common anode and the common cathode of the LEDs of the LED group, wherein the capacitor is charged by driving signals of the LEDs when the LEDs are operated according to a normal working mode or a first status of a burst dimming mode, and discharges to sustain an operating power of the switch circuit when the LEDs are operated according to a second status of the burst dimming mode.

2. The bypass protection circuit as claimed in claim 1, wherein the common anode of the LEDs receives the driving signals.

3. The bypass protection circuit as claimed in claim 1, wherein the driving signals of the LEDs are pulse width modulation (PWM) signals in the burst dimming mode, and the driving signals in the first status of the burst dimming mode are high logic levels and the driving signals in the second status of the burst dimming mode are low logic levels.

4. The bypass protection circuit as claimed in claim 1, further comprising a diode connected between the common anode and the common cathode of the LEDs, to avoid the capacitor to discharge the LEDs in the burst dimming mode.

5. The bypass protection circuit as claimed in claim 1, wherein the switch circuit is an integrated circuit.

6. The bypass protection circuit as claimed in claim 5, wherein the integrated circuit comprises a diode connected between the common anode and the common cathode of the LEDs, to avoid the capacitor to discharge the LEDs in the burst dimming mode.

7. A light emitting diode (LED) driving device to drive a plurality of LED lamp bars, and each LED lamp bar comprising a plurality of LED groups composed of a plurality of LEDs connected in series, wherein each LED group has a common anode and a common cathode at two opposite ends, the LED driving device comprising:
   a power stage circuit to convert external power signals into driving signals to drive the LEDs; and
   at least one bypass protection circuit connected to the LED groups in parallel respectively, to provide a bypass path when any one LED is broken, the bypass protection circuit comprising:
   a switch circuit, comprising:
      a plurality of switch components, wherein each switch component is connected to one LED in parallel, when at least one LED is broken, the switch component corresponding to the at least one broken LED is switched on to provide a bypass path;
      an abnormal detection module to detect voltage of the LEDs respectively, and to output an abnormal signal when the at least one LED is broken; and
      a switch control module connected to the switch components and the abnormal detection module, to control the switch component corresponding to the at least one LED on according to the abnormal signal; and
   a capacitor connected between the common anode and the common cathode of the LEDs of the LED group, wherein the capacitor is charged by driving signals of the LEDs when the LEDs are operated according to a normal working mode or a first status of a burst dimming mode, and discharges to sustain an operating power of the switch circuit when the LEDs are operated according to a second status of the burst dimming mode.

8. The LED driving device as claimed in claim 7, wherein the common anode of the LEDs receives the driving signals.

9. The LED driving device as claimed in claim 7, wherein the driving signals of the LEDs are pulse width modulation (PWM) signals in the burst dimming mode, and the driving signals in the first status of the burst dimming mode are high logic levels and driving signals in the second status of the burst dimming mode are low logic levels.

10. The LED driving device as claimed in claim 7, further comprising a diode connected between the common anode and the common cathode of the LEDs, to avoid the capacitor to discharge the LEDs in the burst dimming mode.

11. The LED driving device as claimed in claim 7, wherein the switch circuit is an integrated circuit.

12. The LED driving device as claimed in claim 11, wherein the integrated circuit comprises a diode connected between the common anode and the common cathode of the LEDs, to avoid the capacitor to discharge the LEDs in the burst dimming mode.

* * * * *